(12) United States Patent
Fraizer (10) Patent No.: US 12,338,965 B2
(45) Date of Patent: Jun. 24, 2025

(54) ENHANCED DIFFUSIVE LIGHTING AND PATTERN EFFECTS OVER AUTOMOTIVE SURFACE PANELS

(71) Applicant: VALEO NORTH AMERICA, INC., Troy, MI (US)

(72) Inventor: Robert Fraizer, Auburn Hills, MI (US)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 18/315,282

(22) Filed: May 10, 2023

(65) Prior Publication Data
US 2024/0084990 A1 Mar. 14, 2024

Related U.S. Application Data

(60) Provisional application No. 63/405,678, filed on Sep. 12, 2022.

(51) Int. Cl.
*F21S 41/20* (2018.01)
*B29D 11/00* (2006.01)
*F21S 43/20* (2018.01)

(52) U.S. Cl.
CPC ...... *F21S 41/285* (2018.01); *B29D 11/00798* (2013.01); *F21S 43/26* (2018.01)

(58) Field of Classification Search
None
See application file for complete search history.

(56) References Cited

U.S. PATENT DOCUMENTS

| | | | |
|---|---|---|---|
| 6,464,382 B1 | 10/2002 | Duflos | |
| 9,970,623 B2 | 5/2018 | Henige et al. | |
| 10,180,229 B2 | 1/2019 | Ahn et al. | |
| 10,507,757 B2 | 12/2019 | Colombel et al. | |
| 10,746,367 B2 | 8/2020 | Paroni et al. | |
| 11,204,146 B2 | 12/2021 | Demontoux et al. | |
| 2005/0068783 A1* | 3/2005 | Egashira | F21S 41/28 362/487 |
| 2006/0040113 A1* | 2/2006 | Deruelle | G01N 29/343 428/447 |
| 2019/0078751 A1* | 3/2019 | Colombel | F21V 11/14 |
| 2019/0143566 A1* | 5/2019 | Choi | F21V 5/00 362/509 |
| 2022/0221121 A1 | 7/2022 | Hwang | |

OTHER PUBLICATIONS

European Patent Office, Preliminary Report on Patentability and Written Opinion of corresponding PCT Application No. PCT/US2023/073866, dated Mar. 27, 2025, 11 pages.

* cited by examiner

*Primary Examiner* — Elizabeth Collister
(74) *Attorney, Agent, or Firm* — Valeo Vision (57) ABSTRACT

The present invention pertains to automotive surface panel illumination with the objective of attaining the whitest diffusive appearance with maximized light intensity transmission features. An automotive luminous panel system includes a luminous unit arrangement as defined by an anti-mist diffusive coating applied to a light transmissive substrate with a corresponding masked cover lens patterned with bleed-gaps that are configured to convey incident light directly through the patterned optical arrangement and operate between the hidden until lit modes of the luminous unit.

19 Claims, 6 Drawing Sheets

ENHANCED DIFFUSIVE LIGHTING AND PATTERN EFFECTS OVER AUTOMOTIVE SURFACE PANELS

TECHNICAL FIELD

The present invention relates to diffusive light formulation and light pattern effects of automotive plastic panels. More particularly, the present invention relates to a coated mask arrangement along a surface panel or cover lens of an automotive luminous unit that applies "ghost effect" transitions during the hidden to lit aspects of road and signal lighting.

BACKGROUND OF THE INVENTION

In the automotive field of vehicle lighting, manufacturers are seeking to improve luminous effects with lighting and signaling functions and desire additional technical enhancements in order to achieve vibrant luminous and aesthetic effects. Certain vehicular signal applications (e.g. daytime running lights (DRLs)) require high intensity lighting with high uniformity to overcome common concerns associated with LED-based lighting, which typically exhibits low uniformity and hot spots.

Among enhancement goals, automakers demand vibrant white diffusive lighting that provide luminous units with a turned-on visible aspect that is different from the unit's turned-off aspect and with the potential for patterns to appear when luminous units are activated. Automakers have also sought vibrant diffusive light formulations to visibly appear along plastic panels between hidden-until-lit modes of automotive luminous units. To date, manufacturers have resorted to obtain such white diffusive appearances by applying particle additives suspended in light transmissive mediums. This approach has rendered less than satisfactory results by providing a grayer "milk-jug look" over a vibrant white sharper uniform look.

Such conventional practices to achieve this diffusive homogeneous-intensity balance present significant drawbacks in vehicle applications that require high uniformity (e.g. signal lamps) and have led designers to apply diffusive techniques such as film, surface glazing, layered coatings, additive optics, additive suspensions or impregnation into light transmissive mediums with exotic optical filters in order to correct or reduce the non-uniform intensities and hot-spot effects. While such approaches can improve uniformity, these approaches have often lead to significant light loss through scattering and other mechanisms leading to losses in light intensity.

Accordingly in the automotive field, there is a need for LED-based luminous units that exhibit a high degree of light uniformity, vibrant light diffusion, opalescent effects and aesthetic design flexibility for producing low-cost luxurious appearances. Unique diffusive arrangements can be formulated through panel and lens cover emissions to resolve and meet these industry's sought after objectives.

SUMMARY OF THE INVENTION

Accordingly, among the objectives of the present invention is to overcome the above mentioned drawbacks of the state of the art. One objective of the present disclosure is to provide an enhanced automotive solution to provide vibrant white diffusive lighting with "ghost effect" technology. Another objective is to produce highly uniform lighting for signal applications, including DRL applications that require lighting patterns with high intensity and uniformity.

An additional objective is to simplify a manufacturing systems and processes to produce enhanced and cost-effective uniform luminous units that produce vibrant white light for automotive surface panels and enhanced styling along cover lenses. And an essential objective is to provide a diffusive coating on a light transmissive cover or panel with the highest light transmission and whitest unlit appearance.

Among the particulars, the present invention proposes making lighting features with an external veiled appearance or "ghost effect" when lighting is extinguished and to produce visibly brilliant white diffusive luminous appearances when lighting is activated. The present invention also proposes making features where light intensity appears consistent and remains homogeneous without added technical complication or additionally needed treatments on transmissive mediums. This being accomplished while simultaneously simplifying elements in the design production by considerable amounts.

In the turned-off state of the luminous unit, a panel lens formed with a patterned mask over the panel lens appears to conceal visibility beyond the panel lens extent. The overlaid pattern mask with light transmissive gaps is expected to keep the same pattern aspect when the luminous unit is turned off or turned on. However given the luminous unit's conditions of being in turned-on or turned-off, the visible appearance through the panel lens of the luminous unit maintains the same pattern but varies in visibility to an observer between the on and off states. Thus, the turned-on aspect of the luminous unit is different from its turned-off aspect. And as such, the luminous unit creates what is called a "ghost effect" according to the invention.

Additionally, a light source beam or incidental light intensity passing through gaps of the pattern mask may vary than that of other sections of panel lens gap areas. Thus, a homogeneous or gradient light intensity can be perceived over the entire illuminated area across the panel lens or light transmissive surfaces of the luminous unit.

These and other objectives of the disclosure may be achieved by one or more of the following aspects. Accordingly, the present invention proposes A luminous panel with light diffusive properties associated with an automotive lighting or signaling system comprising: a polymeric panel of a light transmissive medium; a sealcoat layer on an exterior surface of the polymeric panel; a light-blocking mask on the sealcoat layer, with the light-blocking mask including a pattern formed with a number of bleed-gaps that are created from a laser ablation process; and an anti-mist diffusive coating on an opposing side of the exterior surface.

The luminous panel of an alternate aspect where a sealcoat layer is on the polymeric panel at a time of manufacture of the polymeric panel.

The luminous panel of an alternate aspect wherein the composition of the polymeric panel is formed from a material based on polycarbonate (PC) or polymethyl methacrylate (PMMA).

The luminous panel of an alternate aspect where a composition of a light-blocking mask is overlaid with a thickness (T) of about 12 microns to 15 microns (0.012 mm-0.015 mm).

The luminous panel of an alternate aspect where a number of bleed-gaps are formed from an ablation process on the light-blocking mask.

The luminous panel of an alternate aspect where the anti-mist diffusive coating measures at a thickness (T) or a layer depth of about 8 to 15 microns (0.008 mm-0.015 mm).

The luminous panel of an alternate aspect where the luminous panel with light diffusive properties is incorporated as a part of an automotive assembly or luminous unit.

The luminous panel of an alternate aspect where the sealcoat layer overlays the light-blocking mask and the number of bleed-gaps along the polymeric panel.

The luminous panel of an alternate aspect where wherein the seal coat layer is a polyurethane based material along the exterior side of the polymeric substrate.

The luminous panel of an alternate aspect wherein the luminous panel is configured to produce incident light without hot-spots and with substantial uniformity along the pattern formed with the number of bleed-gaps when activated by a number of light sources of an associated luminous unit.

The luminous panel of an alternate aspect wherein the luminous panel is configured to produce "ghost effect" features to an observer when an associated luminous unit is turned-on to show a visible impression and to show a different impression when the associated luminous unit is turned-off.

A luminous panel of an automotive lighting system comprising:
a polymeric panel of a light transmissive substrate; a sealcoat layer on an exterior side of the polymeric panel; a light-diffusive coating on an opposing side of the exterior side; a mask coat overlaid on the sealcoat layer, with the light-blocking mask including a pattern formed with a number of bleed-gaps that are created from an ablation process; and a number of light sources configured to convey light through the number of bleed-gaps after propagating through the light-diffusive coating, the polymeric panel and through the number of bleed-gaps towards the exterior side.

A luminous panel that comprises:
a polymeric substrate that is light-transmissive; a coating along an interior side of the polymeric substrate that applies an anti-mist function and a light flattening function within an integrated layer that is configured to provide a value of luminescent intensity and a value of light diffusion to an observer; a mask coat of a light-blocking composition applied along an exterior side of the polymeric substrate, the exterior side opposing the interior side; a number of bleed-gaps within the mask coat configured to receive a number of beams of diffusive light through an anti-mist diffusive coating with moisture concealment and light diffusing properties; the number of bleed-gaps formed on the mask coat by a laser ablation method; the diffusive light configured to be blocked from transmission through beyond mask coat through the polymeric substrate but with exception to the number of bleed-gaps [8] within exposed areas of the luminous panel.

The luminous panel of an alternate aspect wherein the anti-mist diffusive coating on the interior side of the polymeric substrate measures at a thickness of about 8 to 15 microns (0.008 mm-0.015 mm).

The luminous panel of an alternate aspect where a composition of a light-blocking mask is overlaid with a thickness (T) of about 12 microns to 15 microns (0.012 mm-0.015 mm).

A method of making a luminous panel comprising:
presenting a polymeric panel of a light transmissive substrate; applying a sealcoat layer on an exterior side of the polymeric panel; applying a light-diffusive coating on an opposing side of the exterior side; applying a mask coat overlaid on the sealcoat layer; Forming a number of bleed-gaps including a pattern from an ablation process with the light-blocking mask; and providing a number of light sources that convey light through the number of bleed-gaps; propagating the number of light sources through the light-diffusive coating, the polymeric panel and through the number of bleed-gaps towards the exterior side.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

Variations and modifications can be made to the aforementioned structure without departing from the concepts of the present invention. And it should be appreciated that the above referenced embodiments and examples are non-limiting, as other embodiment variations can exist within the present invention, as shown and described herein. Moreover, such concepts are intended to be covered by the following claims unless these claims by their language expressly state otherwise.

BRIEF DESCRIPTION OF DRAWINGS

The accompanying drawings that incorporate and constitute a part of the specification, illustrate various embodiments to explain these embodiments together with the description. As such, the accompanying drawings have not necessarily been drawn to scale. Any values dimensions illustrated in the accompanying graphs and figures are for illustration purposes only which may or may not represent actual or preferred values or dimensions. Where applicable, some or all features may not be illustrated to assist in the description of underlying features. In the drawings.

DETAILED DESCRIPTION OF THE INVENTION

The description set forth below as connected with the incorporated drawings are intended as a description of various embodiments of the disclosed subject matter and are not necessarily intended to represent any one select embodiment. In certain instances, the description can include specific details for purposes of providing an understanding of the disclosed embodiments. However, it will be apparent to those skilled in the art that the disclosed embodiments can be practiced without those specific details. In some instances, well-known structures and components can be shown in block diagram form in order to avoid obscuring concepts or design variations of the disclosed subject matter.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "about," "approximately," "proximate," "minor" and similar terms generally refer to ranges that include the identified value within a margin of 20 percent, 10 percent or preferably 5 percent in certain embodiments or any values therebetween.

In the automotive field of vehicle lighting, automakers seek to improve luminous effects with the lighting and signaling functions and desire additional technical enhancements in order to achieve vibrant luminous and aesthetic effects that mutually satisfy vehicle consumers and improve design satisfaction ratings, which enhance manufacturer brands in a cost-effective way.

An existing general concern with Light Emitting Diodes (LEDs) is that LEDs tend to produce highly directional light, which contributes to low uniformity and hot spots. Because certain vehicle signal applications [e.g. daytime running lights (DRLs)] require high intensity with high uniformity, there is a common concern associated with LEDs that they tend to produce highly directional light, which contributes to low uniformity and hot spots.

Among enhancement goals, automakers and customers demand vibrant white diffusive lighting with "ghost effect" technology. "Ghost effect" technology provides a luminous unit a turned-on aspect that renders a visible impression or is unexpectedly different impression from the luminous unit's turned-off aspect. For example when turned off, a luminous unit may have a plain glossy black aspect appearance or darkened backdrop look that gives an observer a concealed view or different impression than when the lighting device is turned on such that an emitted light impression can be uniform when turned on. Additionally, a luminous pattern can appear when the luminous unit is activated. Such a luminous pattern can be purely decorative, can include a manufacturer logo or can even perform a signaling function, such as a night-time position light. Although there can exist various competing solutions in the field that allow "ghost effects" to be created, there remains demand for continuous improvements or enhancements for further solutions.

Another particular enhancement that automakers have demanded is the feature of brilliant white uniform illumination. Automakers request vibrant diffusive light formulations that appear visible along automotive plastic panels between the "ghost effect" hidden-until-lit modes of luminous units. Oftentimes in order to obtain such white diffusive appearances, manufacturers have resorted to particle additives embedded in or in suspension of light transmissive mediums, which has rendered less than satisfactory results with the grayer "milk jug look" over a vibrant white sharper uniform look.

Consequently, conventional limitations and practices present significant drawbacks for vehicle applications that require high uniformity (e.g. signal lamps). These limitations have led designers to apply diffusive techniques such as film, surface glazing, layered coatings, additive optics, additive suspensions to light transmissive mediums and exotic optical filters in order to correct or reduce the non-uniform intensities and hot-spot effects. These conventional approaches often lead to significant light loss through scattering and other mechanisms contributing to light intensity losses.

Accordingly in the automotive field, there's been a need for LED-based luminous units that exhibit a high degree of light intensity with consistent uniformity, vibrant light diffusion, opalescent effects and aesthetic design flexibility for producing low-cost luxurious appearances. Thus, embodiments of the present invention address the objectives of achieving luminous effects through enhanced and cost-effective approaches that provide uniform illumination with brilliant or vibrant white lighting for enhanced styling along cover lenses and automotive surface panels.

For some added background on a lighting product's simplest abstraction, a luminous unit typically includes a containment framework, a lenticular body or a cover lens with a light source from within the containment. An automotive light unit's fabrication involves fixing a cover lens over a luminous unit's containment. A lenticular body is placed over the mouth of the containment framework so as to closeout and form a luminous unit's housing. Oftentimes, emitted light shines through the cover lens or lenticular body when powered on. It is light emissions through the panel or lens cover that the diffusive arrangement can be formulated to address and resolve sought after objectives through various embodiments of this invention.

An automotive luminous unit is intended indifferently to mean a rear vehicle light or a front vehicle light or interchangeably to also be called a headlamp or headlight. As is known, an automotive luminous unit can serve as a vehicle's external light having a lighting or signaling function directed towards the outside of the vehicle. The luminous unit can potentially serve as a position light, a direction or turn indicator light, daytime running light (DRL), a brake light, a fog light, a reversing light, a low-beam headlight, a high-beam headlight or some combination thereof by way of example.

LED signal assemblies are used today with great practical effect. Many motor vehicles now use LED-based lighting assemblies in the automotive industry. The bulk of engineering work in connection with these vehicular lighting assemblies emphasizes a reduction in their overall dimensions. Furthermore, LED-based vehicular assemblies generally rely on multiple LED light sources, where each inherently produces a high light intensity with small beam angles. Accordingly, many LED-based lighting assemblies produce "hot spots" of discrete light associated with each LED light source, inclusive of "low-profile" assemblies. This invention addresses an objective of how to configure and design LED-based vehicular luminous units and assemblies to produce highly uniform lighting for signal applications, inclusive of DRL applications that require lighting patterns with high intensity and uniformity.

Figure 1:
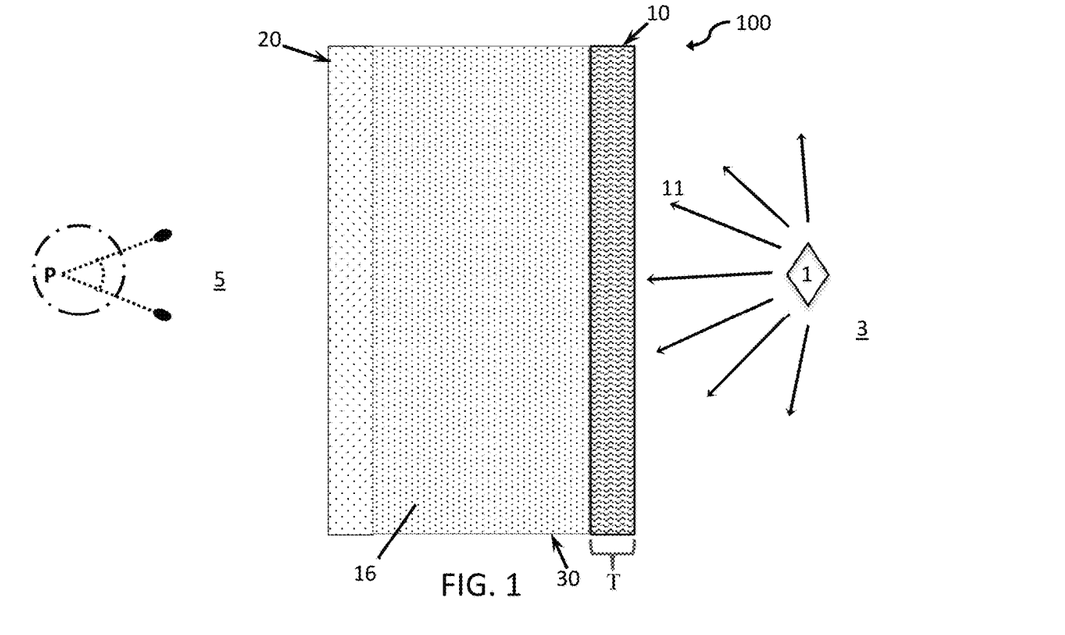
FIG. 1 is an embodiment of a luminous panel and cross-section according to the present invention.

In FIG. 1, a light source 1 represents a luminous source of electromagnetic radiation or an energized source of visually perceived radiant energy (inclusive of "Visible" light of the electromagnetic spectrum) but can include a broad range or combination of electromagnetic or radiant energy inclusive from X-rays, ultraviolet and infrared energy, micro-wave and radio wave spectrums. The light source 1 may include every conventional and suitable lighting element sources such as filament-based or incandescent lamps, fluorescent lamps, arc or gas-discharge type lights, light emitting diodes (LED), or other suitable conventional sources. The light source 1 can include one element or a multiple (a number more than one) of lighting elements.

Highly uniform light is particularly beneficial for many vehicular signal applications (e.g., brake lights, taillights, daytime running lights (DRLs), turn signals, reverse lamps, etc.). In certain vehicular signal applications, lighting assemblies that can produce output lighting patterns with a combination of high uniformity and intensity are particularly advantageous. For example, certain federal regulations mandate that DRLs produce a high intensity lighting pattern and customers frequently demand that such patterns are produced with high uniformity.

In FIG. 1, a cross-section of luminous panel 100 is represented. The luminous panel 100 can include a cover lens or lenticular body and become part of an automotive assembly or lighting device. The luminous panel 100 includes a light transmissive medium 30 (hereinafter "substrate") with an anti-mist diffusive coating 10 and a sealcoat 20. The sealcoat 20 can include a segregate layer to form with substrate 30 or already is included as an integral part of light transmissive medium 30 from a manufactured source. The light transmissive medium 30 includes a polymeric or glass-like composition with light transmissive properties thereby allowing beams 11 from the light source 1 to pass incident light through the substrate 30.

In one embodiment, the light transmissive medium 30 can include a polycarbonate (PC) or polymethyl methacrylate (PMMA) material. The light transmissive medium 30 can include a hardcoat or sealcoat or protective layers within the substrate's 30 constituent or exterior layers. The anti-mist diffusive coating 10 includes a unique formulation that performs both a light-flattening and an anti-mist function feature, which is applied on a side of the light transmissive medium 30, to include an essential part of the luminous panel 100. The anti-mist diffusive coating 10 can include an application means such as spray, manual or mechanical application or dipping by non-limiting examples. In one embodiment, the anti-mist diffusive coating 10 is to include application with a thickness (T) of about 12 micron to 15 micron (0.012-0.015 mm). In an alternate embodiment, the anti-mist diffusive coating 10 can apply a thickness (T) value in a range between 8-12 microns (0.008-0.012 mm) for acceptable results.

The beams 11 emitted from the light source 1 undergo a light-flattening process while propagating incident light through the anti-mist diffusive coating 10 to provide homogenous intensity results towards meeting a balanced homogenous-vibrant intensity objective of this invention. Homogenous light intensity values being consistent along an aspect of the luminous panel's light output to within a 10% variation as measured by known existing methods. Light intensity values can be measured from a number of benchmark locations along an exterior side of the luminous panel for determining homogeneity measurements.

The anti-mist function serves to prevent fogging or obstructive moisture accumulation along an anti-mist diffusive coating's 10 surface by hiding water droplets from view. The primary contributor that enables the anti-mist function of the anti-mist diffusive coating 10 is concealment of the moisture. The anti-mist diffusive coating 10 facilitates water shedding properties through a polyurethane based resin formulation but primarily acts to hide and conceal water droplets rather than working by absorption, through dispersion or having moisture drawn away. A hybrid formulation coating can perform a dual function that includes the light-flattening component and the anti-mist component that can be mutually incorporated to represent the anti-mist diffusive coating 10. Alternatively, a segregate coating formulation with a light-flattening component applied with a secondary coating formulation with an anti-mist component can also be used to achieve equivalent results by a process of distinct coating layers.

The light-flattening function serves to diffuse penetrating light and eliminate hot-spots while also enhancing white light vibrancy. The anti-mist diffusive coating 10 includes a silica based matting agent or matte particles added in concentrations of between 5-9% per volume to reduce gloss and perform the light-flattening function. In one embodiment, the silica based matting agent or matte particles can be stirred-in at sizes between 4 to 12 microns (0.004-0.012 mm) for acceptable results. But in other embodiments, the silica based matting agent or matte particles can be stirred-in at sizes between 6 to 9.5 microns (0.006 mm-0.0095 mm) for more favorable results.

In one embodiment, the anti-mist diffusive coating 10 can be applied within a 8 to 15 micron (0.008-0.015 mm) thickness T range. In another embodiment, the anti-mist diffusive coating 10 is typically applied with a 12 to 15 micron (0.012-0.015 mm) thickness T to achieve more desirable intensity levels as demanded by customers.

Consistent and repeatable intensity levels can be achieved with measurable characteristics using known modeling techniques (Lambertian, Specular, Gegenbauer scattering model phase, Gaussian or other medium material dependent model) from optics field practice when applied with the appropriate model for each respective medium (Transparent-clear, opaque, opalescent, grainy transparent and grainy reflective mediums). Being noted that intensity results are generally a function of light source wavelength, incident angle measurements from the source, measurements along a perimeter span along each incident angle and the light transmissive medium's thickness. Homogenous light intensity values being consistent along an aspect of the luminous panel's light output to within a 10% variation as measured by known existing methods. Light intensity values can be measured from a number of benchmark locations along an exterior side of the luminous panel for determining homogeneity measurements.

The sealcoat 20 represents a protective topcoat against weathering, contaminants and degradation. The sealcoat 20 is preferably a polyurethane-based material or can be another sealant material. The sealcoat 20 is applied along a side of the light transmissive medium 30 either directly or indirectly and can be overlaid with other intermediate constituents (i.e. mask pattern layer). The sealcoat 20 can be applied by any means such as spray, manual or mechanical application, dipping by non-limiting examples.

The anti-mist diffusive coating 10 includes a chemical formulation that provides an anti-mist function (moisture concealment material) and a light-flattening function (light flattening technology) by an integrated application material. Some details of which are already previously disclosed herein and shared above. The anti-mist diffusive coating 10 includes a composition formed from a polyurethane based resin and flattening additives [preferably finely ground silica or glass-based particles of 6 to 9.5 microns (0.006-0.0095 mm) suspended in white-color wavelength pigments], which incorporate light-flattening characteristics to promote diffusion and remove gloss. In alternate embodiments, matting agents or matte particles can include waxes based on polyethylene, polypropylene, PTFE, carnauba or amides in coatings or pigments inclusive within anti-mist diffusive coating 10. Alternatively, flattening additives can include talc or corn starch for similar performance effects but are discouraged for lacking durability due to softness of such constituent materials.

Figure 2:
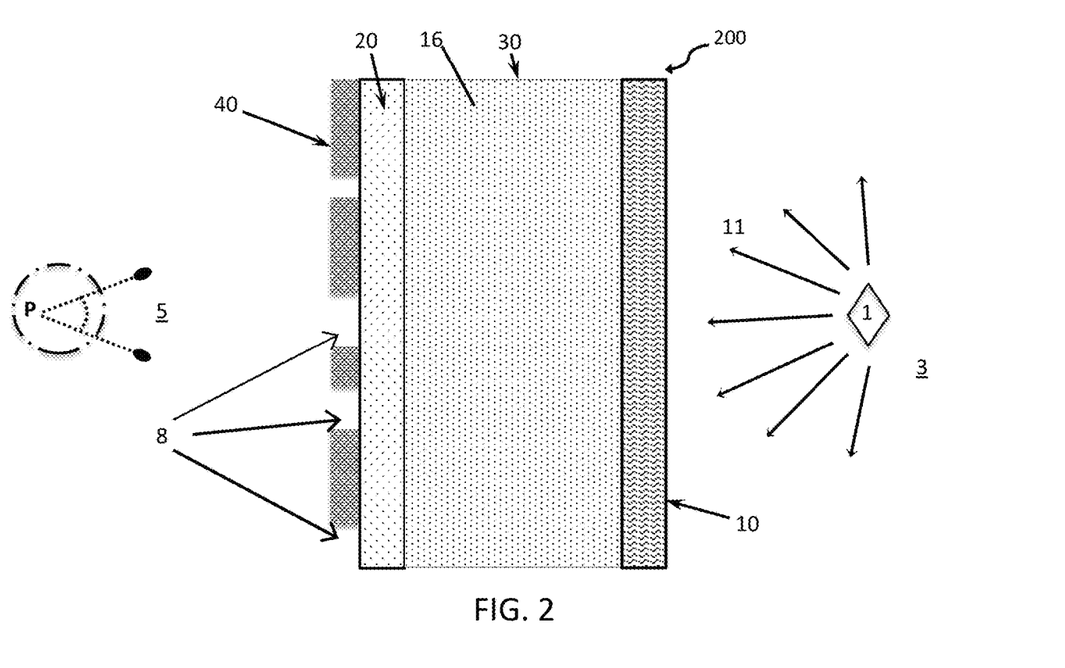
FIG. 2 is an embodiment of a luminous panel cross-section depicting an alternate constituent layup stack according to the present invention.
Figure 4:
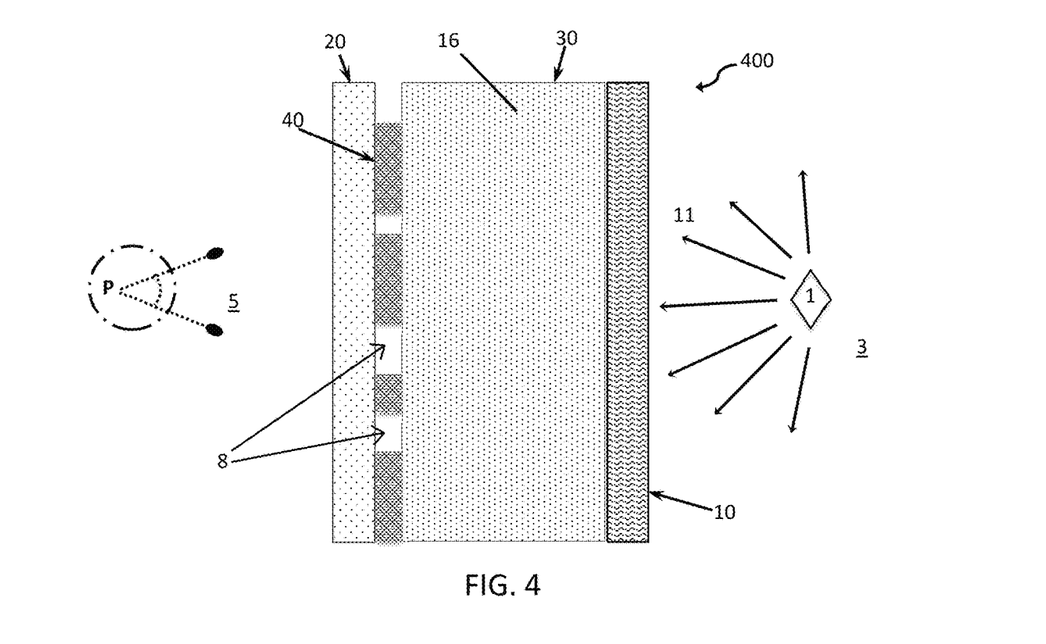
FIG. 4 is an embodiment of a luminous panel cross-section depicting an alternate constituent layup stack according to the present invention.
Figure 5:
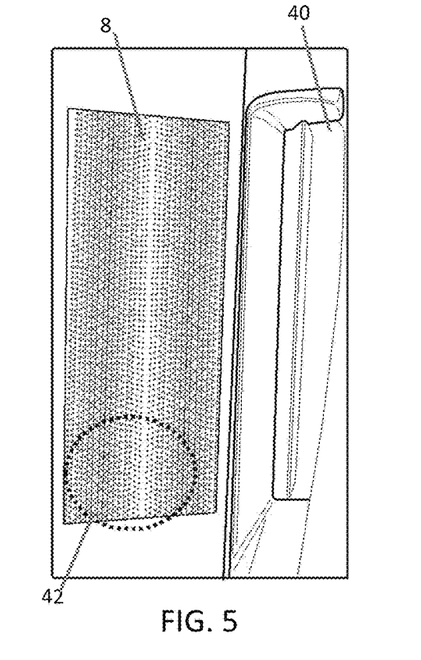
FIG. 5 is a non-limiting illustrated embodiment of an ablated mask pattern applied onto a luminous panel according to the invention.
Figure 6:
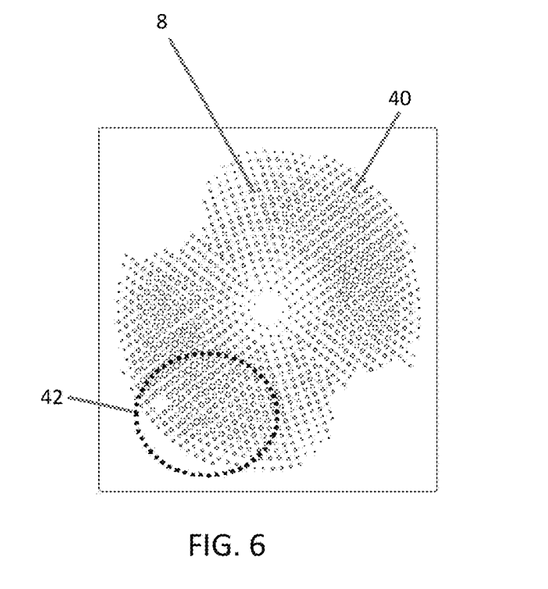
FIG. 6, FIG. 7, FIG. 8, FIG. 9, FIG. 10, FIG. 11 and FIG. 12 are non-limiting examples of ablated mask patterns that can be applied onto luminous panels according to the invention.
Figure 7:
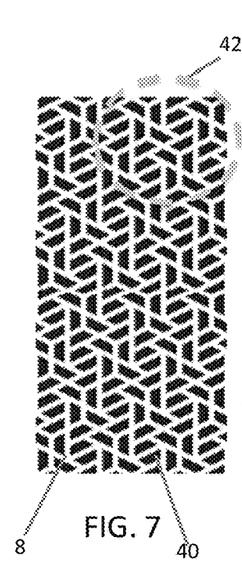
Figure 8:
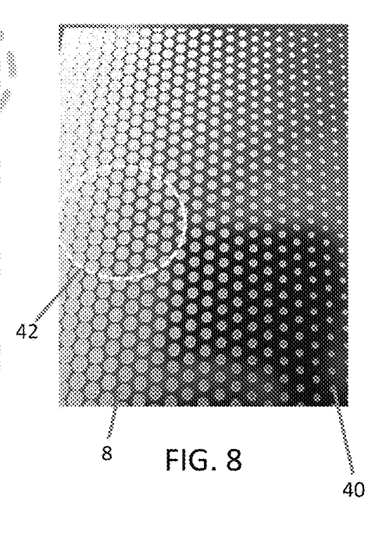
Figure 9:
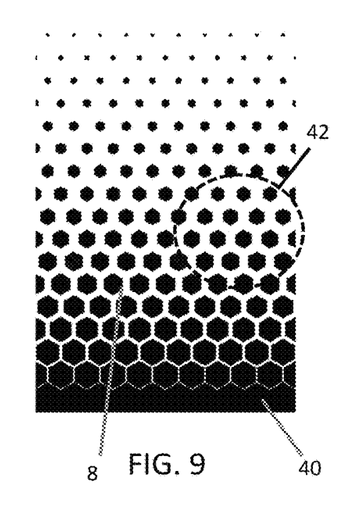

As applicable to FIG. 1, FIG. 2 and FIG. 4, LED light source 1 transmits the beams 11 directly through the anti-mist diffusive coating 10 and a respective luminous panel embodiment, which results in a homogenous light pattern effect as viewed by an observer P that is consistent with the intensity measurement characteristics that can be measured and result from known applied modeling techniques as stated above.

FIG. 2 depicts a cross-section of luminous panel 200, which includes the elements of FIG. 1. The luminous panel 200 can be incorporated into a cover lens or lenticular body and can become part of an automotive assembly or lighting device. FIG. 2 includes a mask coat 40 that illustrates the formation of bleed-gaps 8 within surface pattern areas of the mask coat 40 after the process of ablation on the mask coat 40. Mask coat 40 can be applied to the light transmissive medium 30 by any means such as spray, manually, by mechanical application or dipping process by non-limiting examples. In one embodiment, mask coat 40 can be applied with thickness (T) values of about 12 micron to 15 micron (0.012-0.015 mm) for the best results. For alternate embodiments, mask coat 40 can apply thickness (T) values based on other laser ablation resolution settings adjusted with time-performance results. Through developmental testing, the criticality of this applied thickness for the mask coat 40 is essential to effectively block bleed light through light transmissive medium 30 and avoid gray shadows or undesirable feint hues that make appearances non-crisp by observation.

The LED light source 1 transmits the light beams 11 directly through the anti-mist diffusive coating 10 and the substrate 30 resulting in lighting effects from the formed bleed-gaps 8 as viewed by an observer P, which are consistent with the obtainable intensity measurement values according to known applied modeling techniques as previously stated herein. Homogenous light intensity values being consistent along an aspect of the luminous panel's light output to within a 10% variation as measured by known methods. Light intensity values can be measured from a number of benchmark locations along an exterior side of the luminous panel for determining homogeneity measurements.

The ablation process represents material removal of a deposit or layer of mask coat 40 through an energized wavelength or high-intensity light beam process such as a laser (light amplification by stimulated emission of radiation) by non-limiting example. The ablation process is not limited to a laser-based means of material removal but can also represent other processes of material destruction-removal such as mechanical abrasion, sonic, thermal, UV wavelength or vibrational processes. By one embodiment, ablation applies pattern removal resolutions at about 0.3 mm with 0.3 mm spacing. In alternate embodiments, laser ablation can apply fine or course resolution pattern that are removed, which are obtainable based on an applied laser's wavelength.

Figure 3A:
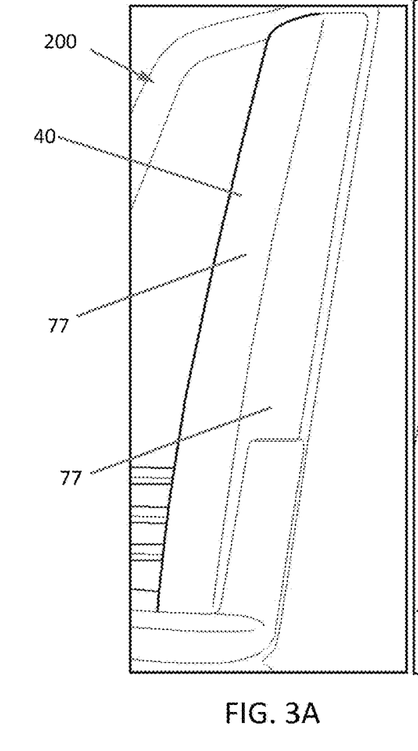
FIG. 3A is a sample embodiment of a luminous panel that demonstrates a "ghost effect" perspective view in the concealed or unlit mode according to the present invention.
Figure 3B:
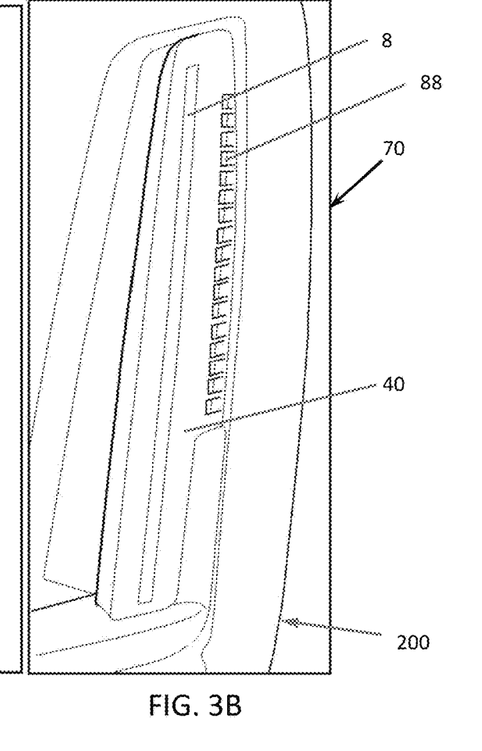
FIG. 3B is a sample embodiment of a luminous panel that demonstrates a "ghost effect" perspective view in the visible or lit mode according to the present invention.

FIGS. 3A and 3B, respectively provide a product sample depiction of what is represented from illustrated embodiment FIG. 2 for the hidden-until-lit aspects of what an observer P can see along luminous panel 200 when unlit (FIG. 3A) as compared to pattern revelations when luminous panel 200 is actively lit (FIG. 3B) through the bleed-gaps 8 of mask coat 40 at associated bleed-areas 88. Bleed-area 88 can represent a section of multiple bleed-gaps 8 that can represent various pattern arrangements.

FIG. 3A depicts how luminous panel 200 might appear to an observer P with an unlit condition where screened sections 77 along the panel surface conceal-hide the formed patterns and bleed-gaps 8, which are indistinguishably hidden within the mask coat 40 while remaining unlit. FIG. 3B depicts the illuminated state of luminous panel 200 with bleed-area 88 patterns and bleed-gaps 8, which reveal pattern features from the hidden ghost state and become distinguishable when lit from mask coat 40 to an observer P. Although mask coat 40 preferably represents a light-blocking composition, mask coat 40 is not-limited only to light blocking characteristics and can also be an opaque or can include iridescent material in various embodiments to enhance lighting effects or regulate light transmission as desired.

FIG. 4 depicts a cross-section of luminous panel 400, similar to the elements of FIG. 2; however, the embodiment of FIG. 4 includes the variation that mask coat 40 and the sealcoat 20 have interchangeable layer locations. The luminous panel 400 can be incorporated into a cover lens or lenticular body and can become part of an automotive assembly or luminous unit 70. In FIG. 4's embodiment, sealcoat 20 overlays the mask coat 40.

Figure 10:
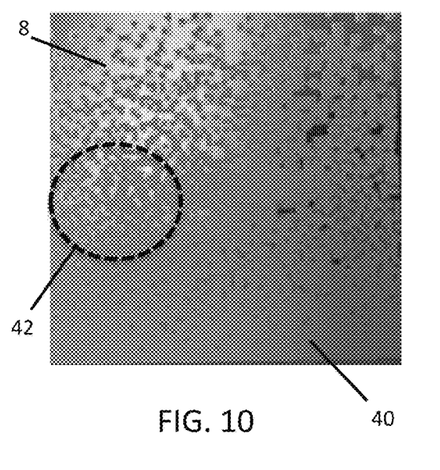
Figure 11:
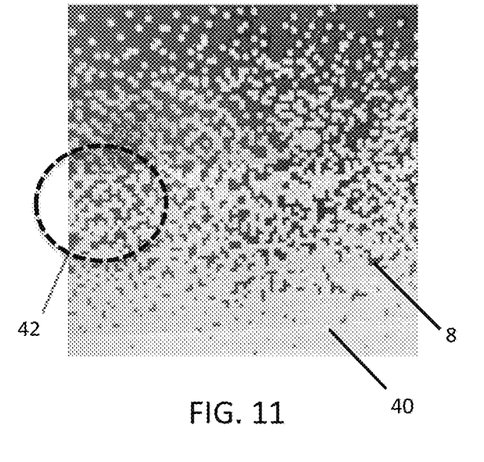
Figure 12:
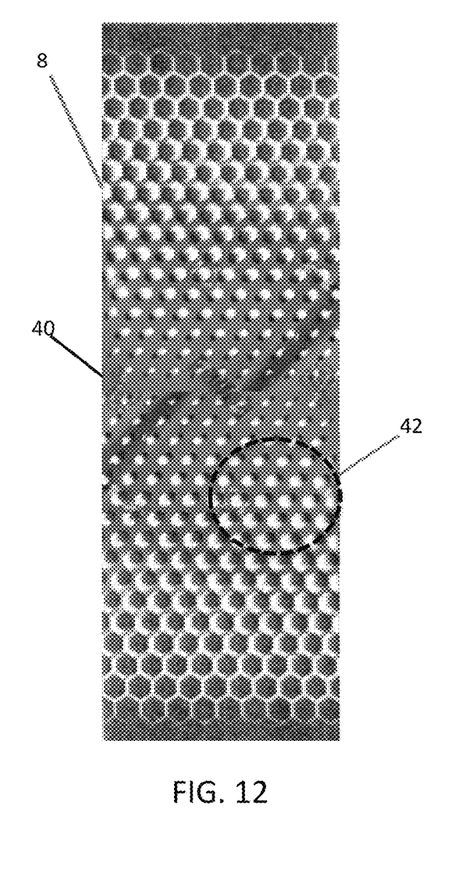

FIG. 5, FIG. 6, FIG. 7, FIG. 8, FIG. 9, FIG. 10, FIG. 11 and FIG. 12 depict a variety of embodiments with distinguished patterns 42 of bleed-gaps 8 that can result from applied laser ablation into mask coat 40. As various illustrative embodiments show, actual graphic examples of fine gradients, dots, geometric shapes or overlaid patterns 42 can be emblazoned using an ablation process such that a number of non-limiting pattern effects can provide additional stylistic, some decorative interest features or lighting effects to the vibrant diffusion. The resolution of the produced patterns 42 can vary between embodiments but one embodiment can produce bleed-gap 8 patterns and bleed-areas 88 at 0.3 mm resolution with 0.3 mm spacing. An alternate embodiment of FIG. 12 depicts a non-limiting example where a laser ablation pattern includes a combination effect with a smoke tinted light transmissive medium 30 and mask coat 40 to produce a sample on surface panel 200. Other examples of producible pixelated patterns 42 along surface panel 200 can be observable in unlit and observable back-lit states as illustrated in FIG. 10 and FIG. 11, respectively.

The previously described light intensity measurements and aspects of achievable intensity effects that are proportionately characteristic with particular variables and factors (as a function of light source wavelength, incident angle measurements from the source, measurements along a perimeter span along each incident angle and the light transmissive medium's thickness and type: transparent-clear, opaque, opalescent, grainy transparent and grainy reflective mediums) can alter the light diffusivity versus white light intensity balance. Some of the listed factors are based on types of light transmissive medium 30 (e.g. Transparent, Opaque, Opalescent, Grainy-Transparent, Grainy Reflective) of various medium thicknesses with applied special treatment or at listed wavelength ranges or with measured incident angles of refraction or with measured operating temperatures under Gaussian, Specular, Lambertian, Gegenbauer model formulated approaches.

Figure 13:
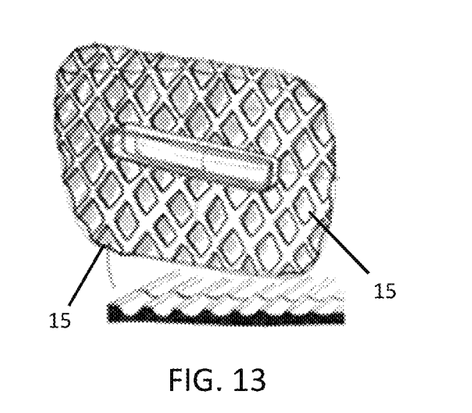
FIG. 13, FIG. 14 and FIG. 15 are non-limiting examples of various form and optical features that can be embedded into the substrate and applied on luminous panels according to the invention.
Figure 14:
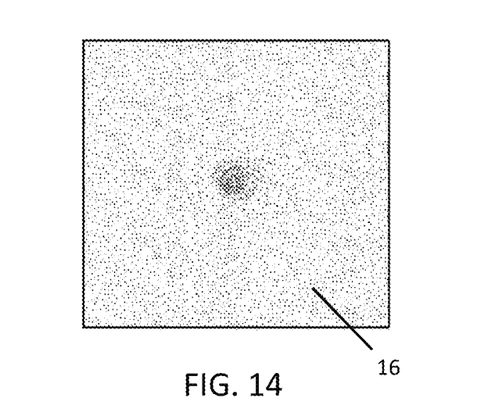
Figure 15:
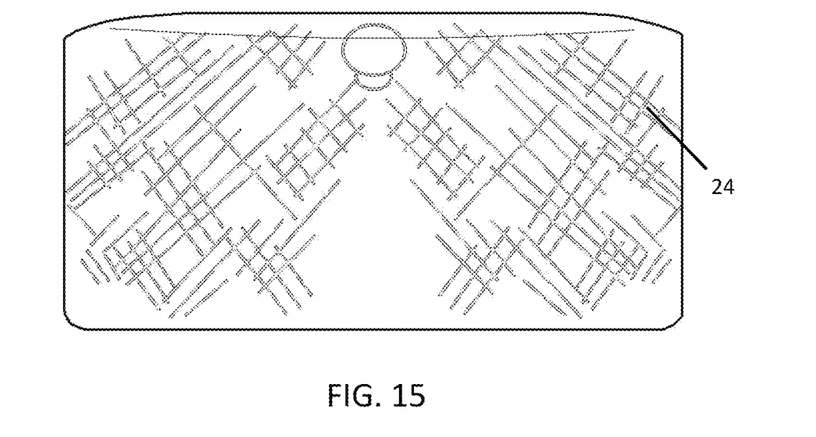

FIGS. 13-15 depict various embodiments and inclusively obtainable effects into the light transmissive medium 30, in a non-limiting way that includes imprints, surface etches, bubbles, cracks, molded-in additives, tint, smoke, colorants or optical effects. By way of non-limiting examples, FIG. 13 depicts a patterned impression into the substrate 30 to enhance optical effects or light dispersion. FIG. 14 depicts bubbling or textural dispersions or embedded features 16 within the substrate 30. FIG. 15 depicts rippling or surface etch patterns 24 into substrate 30 to further enhance light transmission effects.

Figure 16:
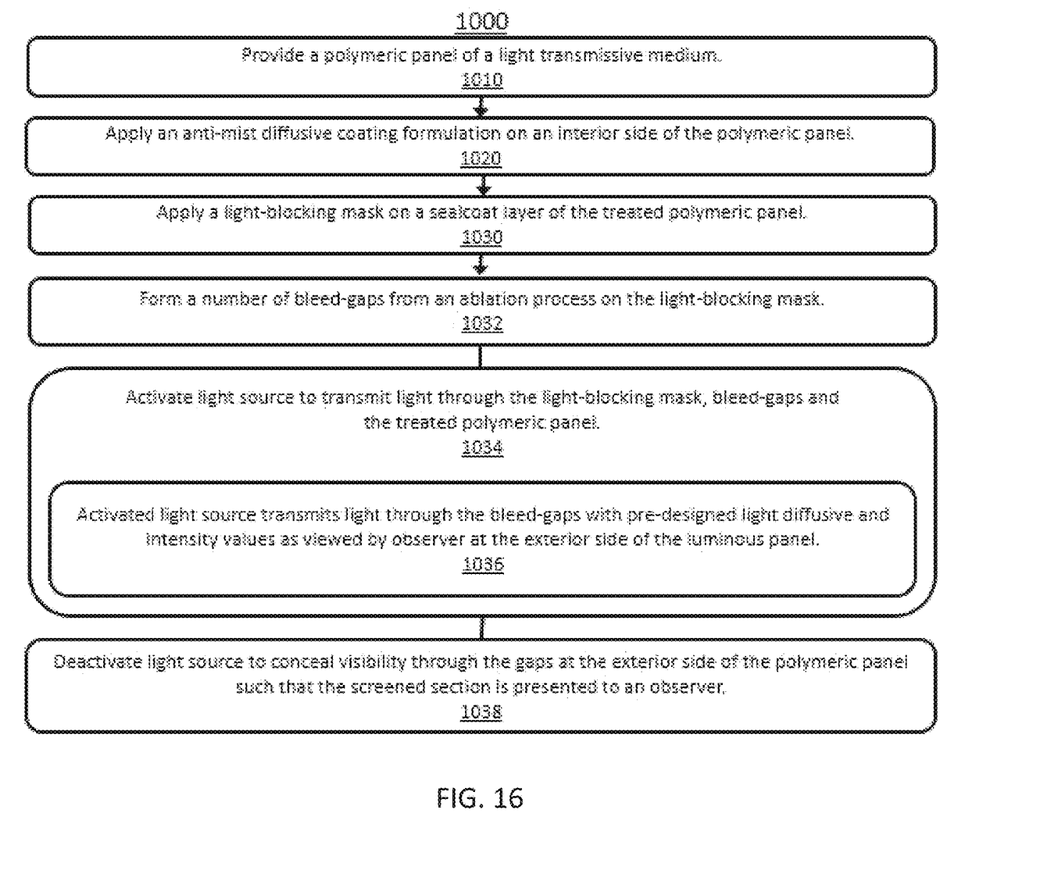
FIG. 16 depicts an illustrative flow-chart method to make a light diffusive panel system according to the invention.

FIG. 16 illustratively depicts an embodiment of the invention and describes the process or method 1000 of making a light diffusive panel system. In method 1000, a substrate or light transmissive medium 30 can form a luminous panel embodiment, accordingly. Among the variable method embodiments for example, two blocks shown in succession may in fact be executed substantially concurrently or the associated blocks may sometimes be executed in the reverse order, depending upon the functionality involved. It will also be noted that each block of the block diagrams or flowchart illustration, and combinations of blocks in the block diagrams or flowchart illustration, can be implemented by both manual or automated systems that perform the specified functions or by acts or carry out combinations of special purpose hardware and control instructions.

In block 1010, a light transmissive medium or substrate 30 of a polymeric material is provided. In block 1020, an anti-mist diffusive coating 10 is applied along a side of the light transmissive medium or substrate 30. In a non-limiting way, the side can represent an exterior, interior or surface side of substrate 30. In block 1030, a light-blocking or opaque mask 40 can be applied over the hardcoat layer 20 or the side of the light transmissive medium or substrate 30. In block 1032, an ablation process can be performed over the light-blocking or opaque mask 40.

In block 1034, a light source from the interior side 3 of the light transmissive medium or substrate 30 can be activate, which is configured to transmit light beams 11 passing through the light-blocking or opaque mask 40 and a number of bleed-gaps 8 to the exterior side 5 of the light transmissive medium or substrate 30. In block 1036, the activated light source 1 can be configured to transmit light beams 11 through the number of bleed-gaps 8 to be viewed with pre-defined diffusivity and light intensity values as measured by an observer P at the exterior side 5 of the light transmissive medium or substrate 30.

In block 1038, the light source 1 deactivation can be configured to conceal visibility through the number of bleed-gaps 8 at the exterior side 5 of the light transmissive medium or substrate 30 as observably measured by an observer P such that the screened section 77 is presented to an observer P. The screened section 77 represents a concealed view or different impression of the associated luminous panel (panel lens or cover panel) between the unlit and lit states through the observable screened section 77 or bleed-gaps 8.

The method 1000 illustrates an embodiment of the production process with the light diffusive panels that incorporate a hidden until lit feature while providing vibrant luminous effects and optical enhancements that meet pre-defined light intensity and diffusive light values or regulatory measurement requirements. Therefore, lighting performance is qualified and enhanced while satisfying market demands with reduced manufacturing costs.

It should be appreciated that the above referenced aspects and examples are non-limiting, as others exist within the present invention as shown and described herein. Unless stated otherwise, dimensions and geometries of the various structures depicted herein are not intended to be restrictive of the invention such that other dimensions or geometries are possible. Plural structural components can be provided by a single integrated structure. Alternatively, a single integrated structure might be divided into separate plural components.

In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

LIST OF ELEMENT NUMBERS

Luminous Panel 100 200 400
LED Light Source 1
Interior Location 3
Exterior Location 5
Light Beam 11
Anti-mist Light Diffusive Coating 10
Sealcoat Composition 20
Substrate—Light Transmissive Medium 30
Mask coat 40
Production patterns 42
Embedded Optic Features 15
Surface optic features 22
Etched Pattern Optics 24
Surface 38
Interior embedded feature 16
Bleed-gap 8
Bleed-area 88
Screened section 77
Luminous Lighting Device Unit 70
Method to Make Luminous Diffusive Panel System 1000

The invention claimed is:

1. A luminous panel with light diffusive properties associated with an automotive lighting or signaling system comprising:
a polymeric panel of a light-transmissive medium;
a sealcoat layer on the polymeric panel;
a mask coat on the sealcoat layer, with the mask coat including a pattern formed with a number of bleed-gaps created from a laser ablation process; and
an anti-mist diffusive coating on the polymeric panel, where the anti-mist diffusive coating is configured to apply an anti-mist function and a light-flattening function through the polymeric panel;

where the anti-mist diffusive coating includes a silica-based matting agent or matte particles in concentrations of between 5-9% per volume of the anti-mist diffusive coating.

2. The luminous panel of claim 1, wherein the polymeric panel includes polycarbonate (PC) or polymethyl methacrylate (PMMA).

3. The luminous panel of claim 1, wherein the mask coat is a thickness of about 12 to 15 microns.

4. The luminous panel of claim 1, where a bleed area is defined by a number of bleed gaps that are configured to form a number of patterns by an ablation process.

5. The luminous panel of claim 1, wherein the anti-mist diffusive coating measures at a thickness of about 8 to 15 microns.

6. The luminous panel of claim 1, wherein the sealcoat layer covers the mask coat and the number of bleed-gaps along the polymeric panel.

7. The luminous panel of claim 1, wherein the sealcoat layer covers the polymeric panel under the mask coat and the number of bleed-gaps.

8. The luminous panel of claim 1, wherein the sealcoat layer is a polyurethane based material.

9. The luminous panel of claim 1, wherein the luminous panel is configured to produce uniform light without discernable hot-spots to the eyes of an observer along the pattern when activated by a light source.

10. The luminous panel of claim 1, wherein the pattern includes a ghost effect feature, with the ghost effect feature configured to generate bleed-area features to an observer when an associated luminous unit is turned-on to show a visible impression and to show a different impression when the associated luminous unit is turned-off.

11. The luminous panel of claim 1, where emitted light through the luminous panel is configured to undergo a light-flattening process after propagating incident light through an anti-mist diffusive coating.

12. The luminous panel of claim 1, further including a composition that is configured to diffuse penetrating light and eliminate hot-spots.

13. The luminous panel of claim 1, where a lenticular body is represented as part of said automotive system.

14. The luminous panel of claim 1, where vibrant white diffusive lighting is configured to result in a light output value that is homogenous to within a 10% variation along a perimeter span of the luminous panel as measured by a known process.

15. The luminous panel of claim 1, where vibrant white diffusive lighting is configured to result to an observer when light activation is applied to the luminous panel from a "ghost effect" condition.

16. A motor vehicle using a luminous panel that comprises:
a polymeric substrate that is light-transmissive;
a hybrid coating on the polymeric substrate that applies an anti-mist function and a light flattening function within an integrated layer that is configured to provide a pre-defined value of luminescent intensity and a pre-defined value of light diffusion to an observer;
where the hybrid coating includes a silica-based matting agent or matte particles in concentrations of between 5-9% per volume of the hybrid coating;
a mask coat of a light-blocking composition applied on the polymeric substrate, on an exterior side opposing an interior side;
a number of bleed-gaps, formed by laser ablation, within the mask coat, the number of bleed-gaps configured to receive a number of beams of diffusive light through the hybrid coating.

17. The motor vehicle of claim 16, wherein the hybrid coating on the polymeric substrate measures at a thickness of about 0.008 mm-0.015 mm.

18. The motor vehicle of claim 16, where a composition of a mask coat is a thickness of about 0.012 mm-0.015 mm.

19. A method of making a luminous panel of an automobile comprising:
providing a polymeric panel of a light-light-transmissive substrate;
applying a sealcoat layer on the polymeric panel;
applying a light-diffusive coating on the polymeric panel, the light-diffusive coating including a silica-based matting agent or matte particles in concentrations of between 5-9% per volume of the light-diffusive coating;
overlaying a mask coat on the sealcoat layer; and
applying a laser ablation process on the mask coat to form a number of bleed-gaps in a pattern.

* * * * *